United States Patent
Ohashi et al.

[11] Patent Number: 5,961,916
[45] Date of Patent: Oct. 5, 1999

[54] METHOD OF MANUFACTURING A PASSAGE TUBE FOR PASSING PLASMA PRODUCING GAS

[75] Inventors: Toshio Ohashi, Komaki; Michio Asai, Nagoya, both of Japan

[73] Assignee: NGK Insulators, Ltd., Japan

[21] Appl. No.: 09/048,659

[22] Filed: Mar. 26, 1998

[30] Foreign Application Priority Data

Mar. 27, 1997 [JP] Japan ................................. 9-075327

[51] Int. Cl.$^6$ ................................................. C04B 33/32
[52] U.S. Cl. .................... 264/642; 264/632; 264/643; 264/655; 264/678; 156/89.11
[58] Field of Search ................................. 264/642, 643, 264/655, 632, 678; 156/89.11

[56] References Cited

U.S. PATENT DOCUMENTS

| | | | |
|---|---|---|---|
| 4,330,496 | 5/1982 | Desplanches et al. | 156/189.11 |
| 4,940,843 | 7/1990 | Adachi et al. | 264/655 |
| 5,106,550 | 4/1992 | Yogo et al. | 156/189.11 |
| 5,814,818 | 9/1998 | Ohashi et al. | 250/432 R |

FOREIGN PATENT DOCUMENTS

62-1502   1/1987   Japan ..................................... 264/642

*Primary Examiner*—James Derrington
*Attorney, Agent, or Firm*—Wall Marjama Bilinski & Burr

[57] ABSTRACT

A passage tube including a ceramic tube body through which plasma producing gas passes and is irradiated from outside the ceramic tube body with ultraviolet rays, and a ceramic flange member joined to an outer peripheral surface of the ceramic tube body, is manufactured by forming calcined bodies for the passage tube body and flange member, machining the calcined body for the tube body so as to form a first portion and a second portion having an outer diameter larger than that of the first portion, joining the calcined body for the flange member to a stepped region between the first portion and the second portion and sintering them.

5 Claims, 10 Drawing Sheets

FIG_10

METHOD OF MANUFACTURING A PASSAGE TUBE FOR PASSING PLASMA PRODUCING GAS

BACKGROUND OF THE INVENTION

1. Field of the Invention

This invention relates to a method of manufacturing a passage tube through which plasma producing gas passes and is irradiated by an ultraviolet ray.

2. Description of Related Art

Recently, a plasma treating apparatus that has high treating efficiency and is capable of conducting work with high precision has frequently been used with the rapid advance for the formation of fine semiconductor patterns. For example, plasma is used for forming a fine pattern by forming a thin film on a substrate to be treated and then selectively etching the thin film. When the plasma is produced, gas is ionized to produce a radical of gas constituting molecule and the resulting radical is impinged onto the substrate to promote a reaction. As the radical, there are ion radicals and neutral radicals, both of which are very active and effectively promote vapor phase growth and dry etching.

Quartz is used as the material for the passage tube for passing the plasma producing gas. Meanwhile, when radicals of a halide gas are used, which are particularly corrosive, the passage tube becomes corroded and must be replaced frequently. Although quartz is high in ultraviolet translucency, the transparency of quartz is particularly lost by the corrosion through plasma of corrosive halide gas and hence it is easy to lower the efficiency of ultraviolet translucency.

The inventors have made studies with respect to the material of the passage tube and found that a specified translucent alumina has a very high corrosion resistance against plasma and a translucency for ultraviolet ray, which has been disclosed in Japanese Patent Application No. 8-149232. That is, the specification of this patent application disclosed that a tube body and a flange member for facilitating the arrangement of the tube body to a plasma treating apparatus are made from the translucent alumina and the tube body is jointed to a flange member.

However, it has been confirmed that there are technical problems in the process of manufacturing such a passage tube. That is, in order to manufacture this tube, it is required to fix the flange member to the tube body so as to make the flange member perpendicular to the tube body. In this case, it is further required to keep airtightness of the joint interface between the tube body and the flange member so as not to cause leakage of plasma producing gas from the joint interface. However, it is difficult to obtain such a joint body.

SUMMARY OF THE INVENTION

It is, therefore, an object of the invention to make the flange member perpendicular to the tube body and prevent the occurrence of leakage of plasma producing gas from the joint interface between the tube body and the flange member in the production of a passage tube comprising a ceramic tube body through which plasma producing gas passes and is irradiated from outside the ceramic tube body with ultraviolet rays, and a ceramic flange member joined to an outer peripheral surface of the ceramic tube body.

According to the invention, there is the provision of a method of manufacturing a passage tube comprising a ceramic tube body through which plasma producing gas passes and is irradiated from outside the ceramic tube body with ultraviolet rays, and a ceramic flange member joined to an outer peripheral surface of the ceramic tube body, which comprises the steps of; calcining a shaped tube body to obtain a calcined body, machining an outer peripheral surface of the calcined body to form a first portion and a second portion having an outer diameter larger than that of the first portion with a stepped region defined between the outer peripheral surface of the first portion and the outer peripheral surface of the second portion, and then joining a calcined body for the flange member to the stepped region of the calcined tube body and sintering them.

In order to join the tube body and the flange member so as to make the flange member perpendicular to the tube body, the inventors have tried dividing the tube body into a first portion having a relatively small outer diameter and a second portion having a relatively large outer diameter, or forming a stepped region between the outer peripheral surface of the first portion and the outer peripheral surface of the second portion, and then joining and fixing the flange member to the stepped region along the surface thereof. It is believed that the positional relationship between the tube body and the flange member is vertically maintained by closely bonding the flange member to the surface of the stepped region.

For this purpose, the inventors have attempted to form the stepped region on the outer peripheral surface of the tube body by shaping a starting powder for the tube body through a press shaping method or the like and then subjecting the resulting shaped body to cutting.

However, it is actually very difficult to cut the shaped body. This is because the sintered passage tube must have a first portion that is transparent to ultraviolet ray. This requires the first portion to have a very thin thickness of, for example, 0.5 mm and hence the thickness of the shaped body is required to be as thin as 0.8–1.0 mm. At the cutting stage, however, cracks occur in the shaped body and hence a strong joint body having airtightness can not be obtained.

Now, the inventors have hit on an idea that the shaped tube body for the passage tube is calcined to obtain a calcined body, and then an outer peripheral surface of the calcined body is machined so as to form a first portion and a second portion having an outer diameter larger than that of the first portion with a stepped region defined between the outer peripheral surface of the first portion and the outer peripheral surface of the second face, and thereafter the flange member is joined to the first portion. That is, the stepped region for joining and fixing the flange member is formed on the calcined body.

As a result, the inventors have succeeded in obtaining a strong joint body in which the flange member is made perpendicular to the tube body and no leakage of plasma producing gas is caused from the joint interface between the tube body and the flange member.

In this invention, translucent alumina is particularly favorable as a ceramic constituting the tube body.

In the tube body, the thickness of the second portion is made larger than that of the first portion. Since the efficiency of ultraviolet translucency in the first portion is mainly required to be high, preferably not less than 70%, the thickness of the first portion is thinned to increase the efficiency of ultraviolet translucency. On the other hand, the corrosion resistance of the second portion against plasma is increased by thickening the second portion, whereby the durability of the tube body before replacement can be extended.

From this point of view, the thickness of the first portion is preferably to be not more than 0.8 mm, more particularly 0.5–0.8 mm. On the other hand, the thickness of the second portion is preferably not less than 1.0 mm, more particularly not less than 1.2 mm. Moreover, a ratio of thickness of the second portion to the thickness of the first portion is preferably not less than 2.0. Further, the width of the stepped region between the outer peripheral surfaces of the first and second portions is preferably to be not less than 1.0 mm.

In the first portion of the tube body, it is preferable that an average particle size of the translucent alumina constituting the tube body is not less than 35 $\mu$m but not more than 50 $\mu$m. On the other hand, in the second portion of the tube body, it is not required to make the efficiency of ultraviolet translucency high. And also, the second portion is located in the vicinity of a chamber of a plasma treating apparatus, so that the corrosion resistance of the second portion against plasma is required to be much higher as compared with that of the first portion. Therefore, it is preferable that an average particle size of the translucent alumina constituting the second portion is not more than 35 $\mu$m, preferably not more than 30 $\mu$m.

As the plasma producing gas, use may be made of reactive gases such as $NF_3$, $CF_4$, $CHF_3$, $CCl_4$, $BCl_3$, $CCl_2F_2$ and the like. In order to increase the etching rate or selectivity, oxygen, chlorine, helium, argon or the like may be compounded with these reactive gases.

BRIEF DESCRIPTION OF THE DRAWINGS

The invention will be described with reference to the accompanying drawings, wherein.

DESCRIPTION OF PREFERRED EMBODIMENTS

Figure 1:
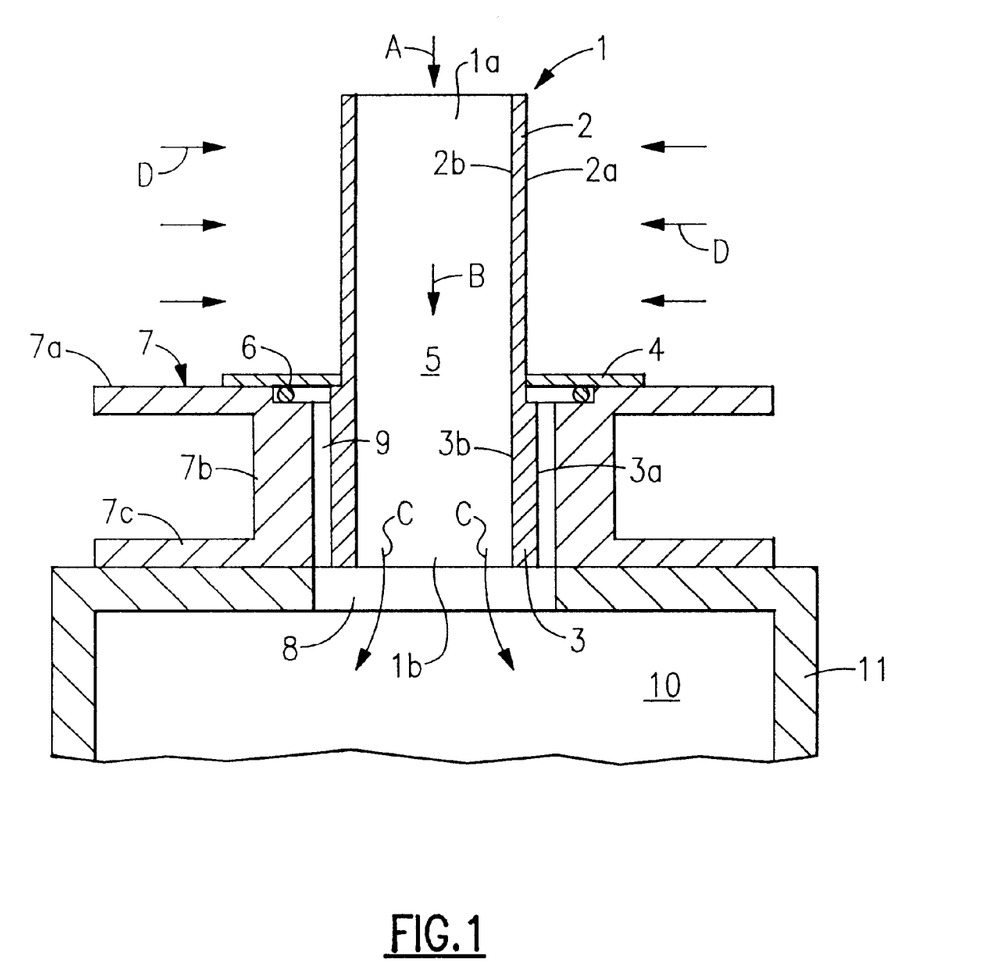
FIG. 1 is a diagrammatically sectional view of an embodiment of a main part of the plasma treating apparatus according to the invention.

FIG. 1 is a diagrammatically sectional view of a main part of an embodiment of the plasma treating apparatus according to the invention. After a substrate to be treated is placed in a treating space 10 of a chamber 11 in the plasma treating apparatus, pattern-forming treatment, cleaning treatment and the like are carried out through plasma. A mount member 7 is disposed on an opening 8 of the chamber 11. The mount member 7 comprises a cylindrical hollow body 7b and flanges 7a and 7c extending outward from both ends of the cylindrical hollow body 7b. The lower-side flange 7c is airtightly fixed to the chamber 11.

A passage tube of the illustrated example comprises a cylindrical tube body 1 for the passage tube and an annular flange member 4 airtightly joined to an outer peripheral surface of the tube body 1. The tube body 1 comprises a first portion 2 located upward from the flange member 4 and a second portion 3 located downward therefrom in FIG. 1. An outer peripheral surface 2a of the first portion 2 is not exposed to plasma producing gas. The flange member 4 is airtightly joined to the mount member 7 through an O-ring 6 and fixed to the flange 7a thereof, so that the second portion 3 is at a fixed state inside an inner space 9 of the mount member 7.

In the operation of the apparatus, a plasma producing gas is flown from an inlet 1a of the passage tube 1 into a passage space 5 as shown by arrows A and B. In this case, ultraviolet rays are irradiated to the first portion 2 of the tube body 1 from the outside thereof. The plasma producing gas further passes through the inside of the second portion 3 and is flown from an outlet 1b into an inside of the chamber 11 as shown by an arrow C. Therefore, the inner peripheral surface 2b of the first portion 2 and the inner and outer peripheral surfaces 3a and 3b of the second portion 3 are contacted with the plasma producing gas.

Figure 2A:
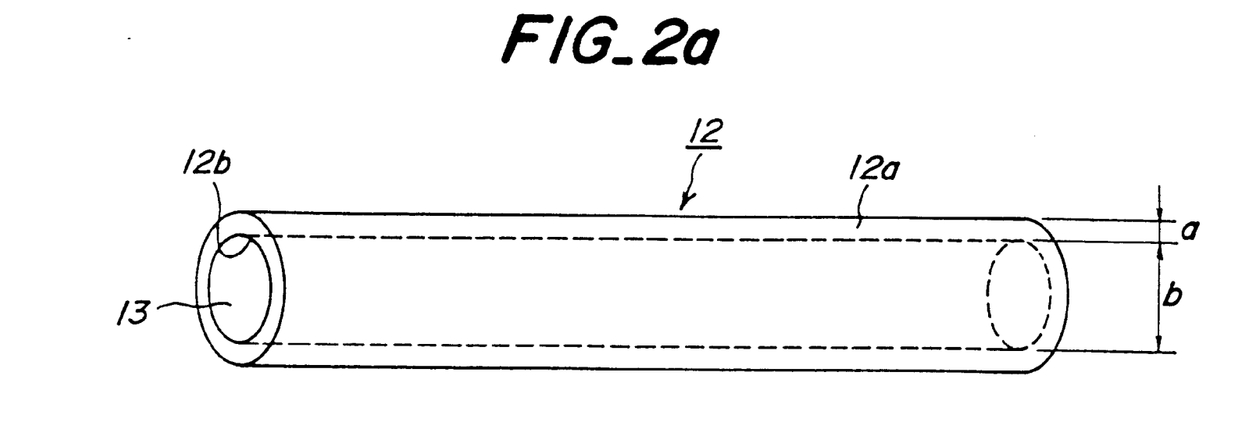
FIG. 2a is a perspective view illustrating a shaped body 12 for a passage tube body.

The manufacturing process of the passage tube as shown in FIG. 1 will be described below. At first, a starting powder is shaped to obtain a shaped body 12 for the passage tube body as shown in FIG. 2a. In the shaped body 12, numeral 12a is an outer peripheral surface, numeral 12b an inner peripheral surface, and numeral 13 an inner space. The shaping method is not particularly limited.

When the passage tube body and the flange member are made from translucent alumina, a starting material is formed by adding alumina starting powder having a purity of not less than 99.99% with an additive for controlling a particle size in the sintering, from which a shaped body is formed by mechanical pressing, cold isostatic pressing, extrusion technique or the like. Then, the shaped body is degreased, and sintered at 1,800–1,900° C. in a hydrogen atmosphere. The sintered body is transparent and consists of homogeneous hexagonal crystal grains. In the thus obtained translucent alumina, the total light translucency in a visible light region (600 nm) reaches approximately 96%.

At the stage of FIG. 2a, the thickness of the shaped body 12 as a whole is made uniform by machining the outer peripheral surface of the shaped body 12 to remove an ununiform portion in thickness of the shaped body 12. In this stage, it is usually considered that in order to obtain a passage tube body having a given size when the shaped body 12 is fired, the shaped body is subjected to machining so as to thin the thickness of the shaped body in accordance with the above given size. In this case, however, cracks are easily created in the shaped body. For this end, the thickness of the shaped body at the stage of FIG. 2a is preferable to be 2.7–3.0 mm so as not to cause cracks in the shaped body.

Figure 2B:
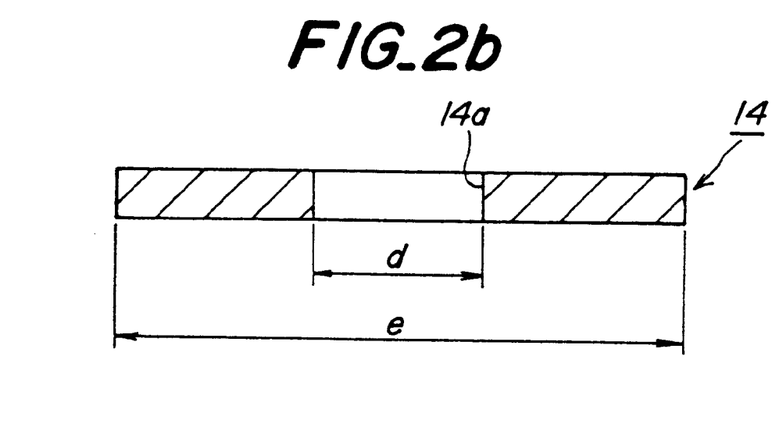
FIG. 2b is a sectional view illustrating a shaped body 14 for a flange member.

On the other hand, there is obtained a shaped body 14 for the flange member having a central hole 14a as shown in FIG. 2b. The shaped body 14 for the flange member is subjected to machining so as to provide a given size after the firing.

Figure 3:
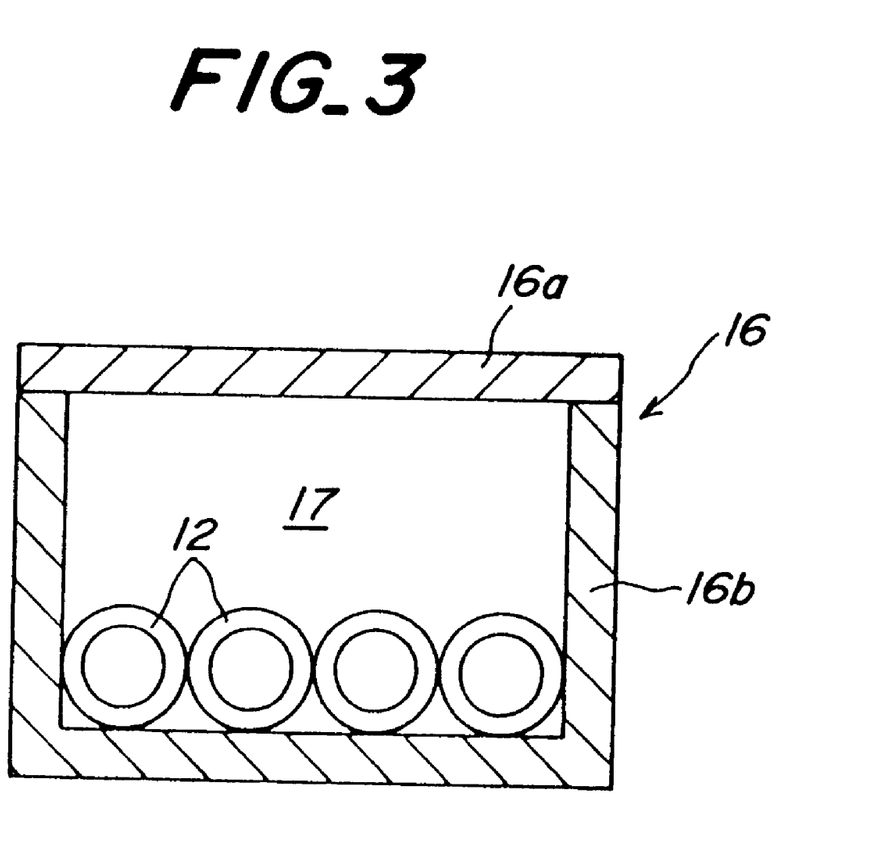
FIG. 3 is a diagrammatically sectional view illustrating a state of placing plural shaped bodies 12 in a calcining furnace.

Then, the shaped body 12 is placed in an inner space 17 of a calcining furnace (or degreasing furnace) 16 as schematically shown in FIG. 3 and calcined therein. In this case, numeral 16b is a main body of the calcining furnace 16 and numeral 16a a lid.

Figure 4A:
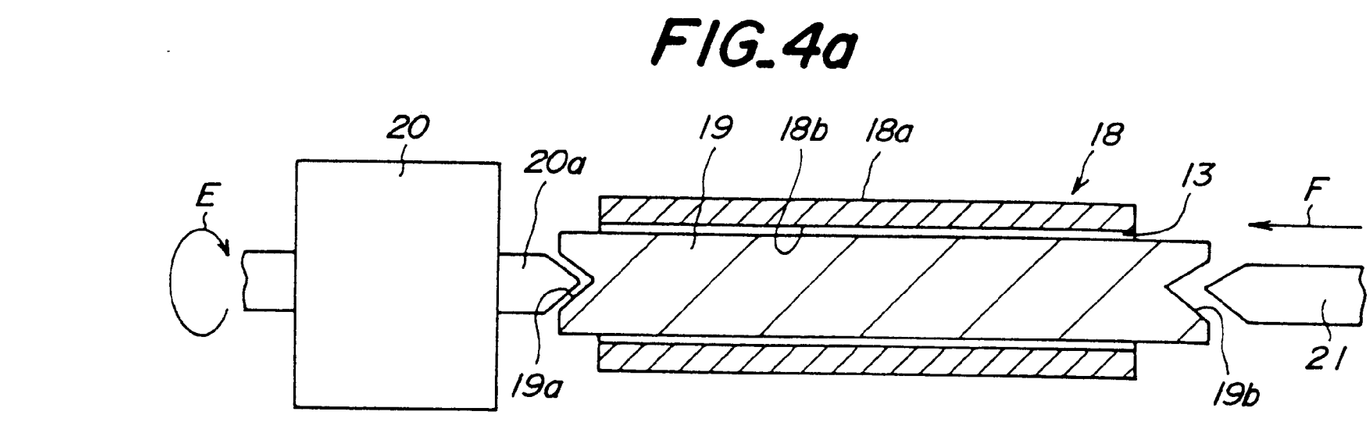
FIG. 4a is a schematically sectional view illustrating a state of setting a tubular calcined body 18 on a lathe.

As shown in FIG. 4a, a center core 19 is inserted into an inner peripheral surface 18b of the resulting calcined body 18, and thereafter a notch 19a of the center core 19 is fitted with a protrusion 20a of a chuck 20 in a lathe (not shown), while another chuck 21 is moved as shown by an arrow F and fitted into another notch 19b. Thus, the center core 19 is fixed so as not to swing about a rotating axis of the center core and then rotated as shown by an arrow E to machine the outer peripheral surface 18a of the calcined body 18 through a cutting tool.

Figure 4B:
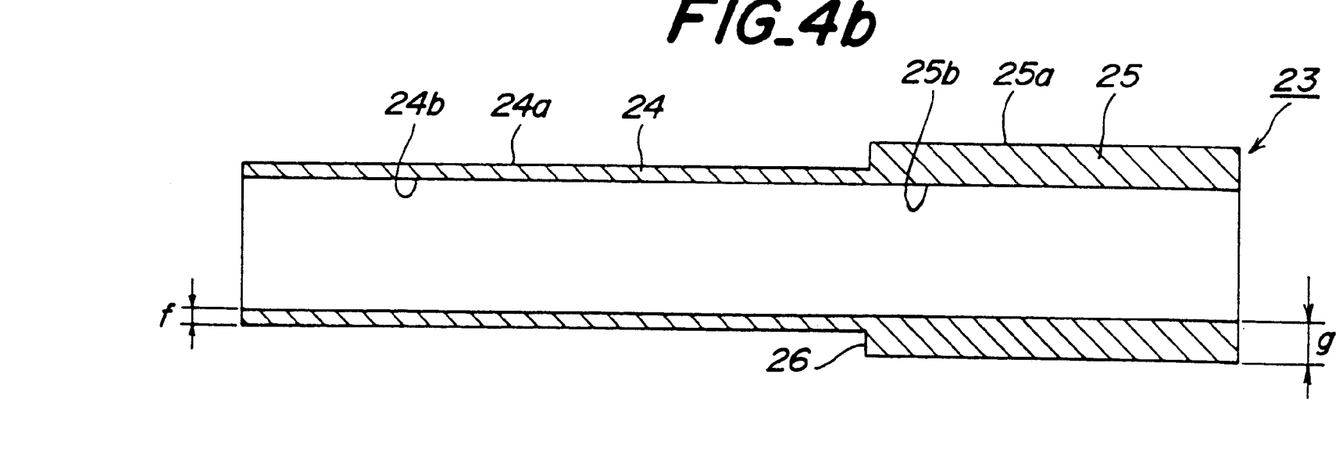
FIG. 4b is a diagrammatically sectional view of a calcined body 23 for the passage tube body after cutting.

By this machining is obtained a calcined body 23 having a sectional shape as shown in FIG. 4b. The calcined body 23 is composed of a calcined body portion 24 corresponding to the first portion 2 and a calcined body portion 25 corresponding to the second portion 3, in which an inner peripheral surface of the calcined body portion 24 is continuous to an inner peripheral surface 25b of the calcined body portion and a thickness "f" of the calcined body portion 24 is made thinner than a thickness "g" of the calcined body portion 25. As the result, a stepped region 26 is formed between an outer peripheral surface 24a of the calcined body portion 24 and an outer peripheral surface 25a of the calcined body portion 25.

In this way, the first portion 24, the second portion 25, and the stepped region 26 therebetween are formed successfully without cracking by once changing the shaped body into the calcined body and then machining the outer peripheral surface of the calcined body. In case of forming the passage tube body with the translucent alumina, the calcining temperature for the calcined body is preferably not lower than 750° C. and in this case cracks hardly occur in the calcined body when the calcined body is subjected to cutting. Furthermore, the calcining temperature is preferably not higher than 950° C. and in this case it is easy to machine the calcined body.

Figure 5:
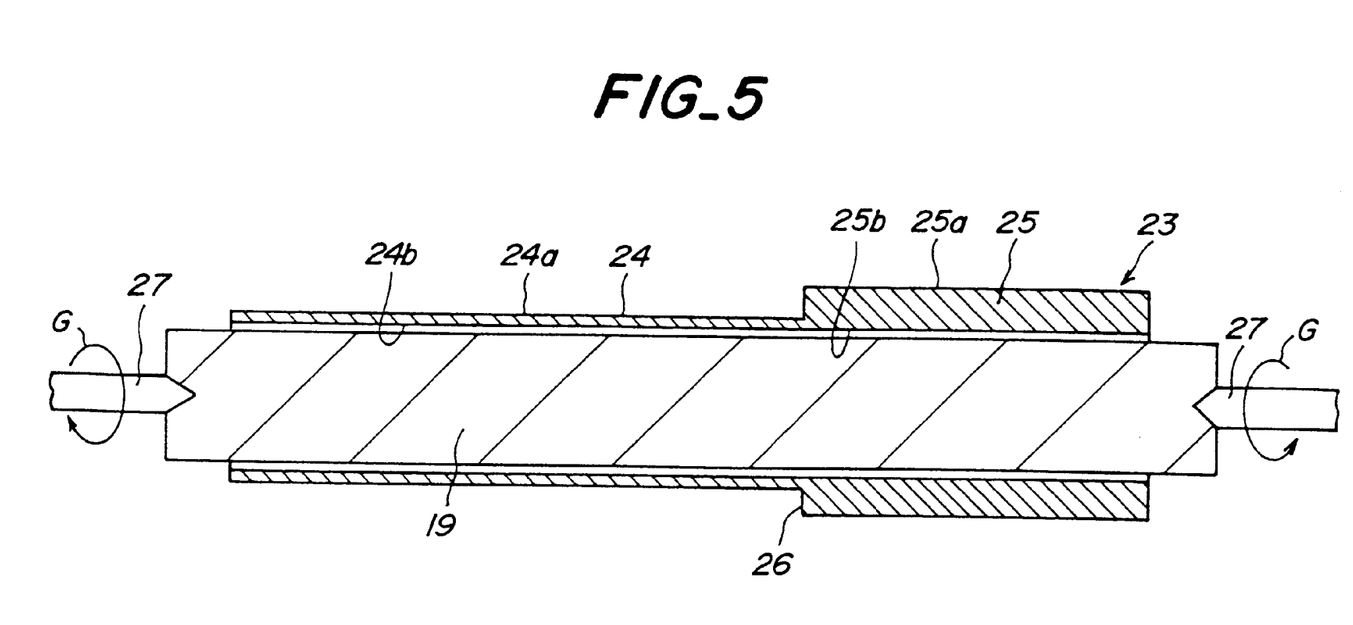
FIG. 5 is a diagrammatically sectional view illustrating a state of setting a calcined body 23 for the passage tube body on another lathe before the assembling of a calcined body 30 for a flange member.

Next, as shown in FIG. 5, the center core 19 is inserted into the calcined body 23 and each end of the center core 19 is fixed by a respective chuck 27 of a lathe. By actuating the lathe the center core 19 can be rotated in a direction shown by arrow G. Then, the calcined body for the flange member is set onto the calcined body for the passage tube body as follows.

According to the invention, the calcined body for the flange member can be fixed to the stepped region of the calcined body for the passage tube body by forming a ceramic paste layer between the calcined body for the passage tube body and the calcined body for the flange member to obtain an assembled body and firing them. Thus, the flange member is fixed to the stepped region so as to extend in a direction perpendicular to the passage tube body and also there is no leakage of gas from an interface between the tube body and the flange member. This is considered to be related to water pickup of the calcined body.

In this embodiment, it is preferable to adhere water to at least a stepped region of the passage tube body prior to the formation of the ceramic paste layer between the calcined body for the tube body and the calcined body for the flange member. By such a pretreatment, the ceramic paste is easily wetted from the stepped region to the interior of the tube body, whereby the airtightness is maintained.

Figure 6:
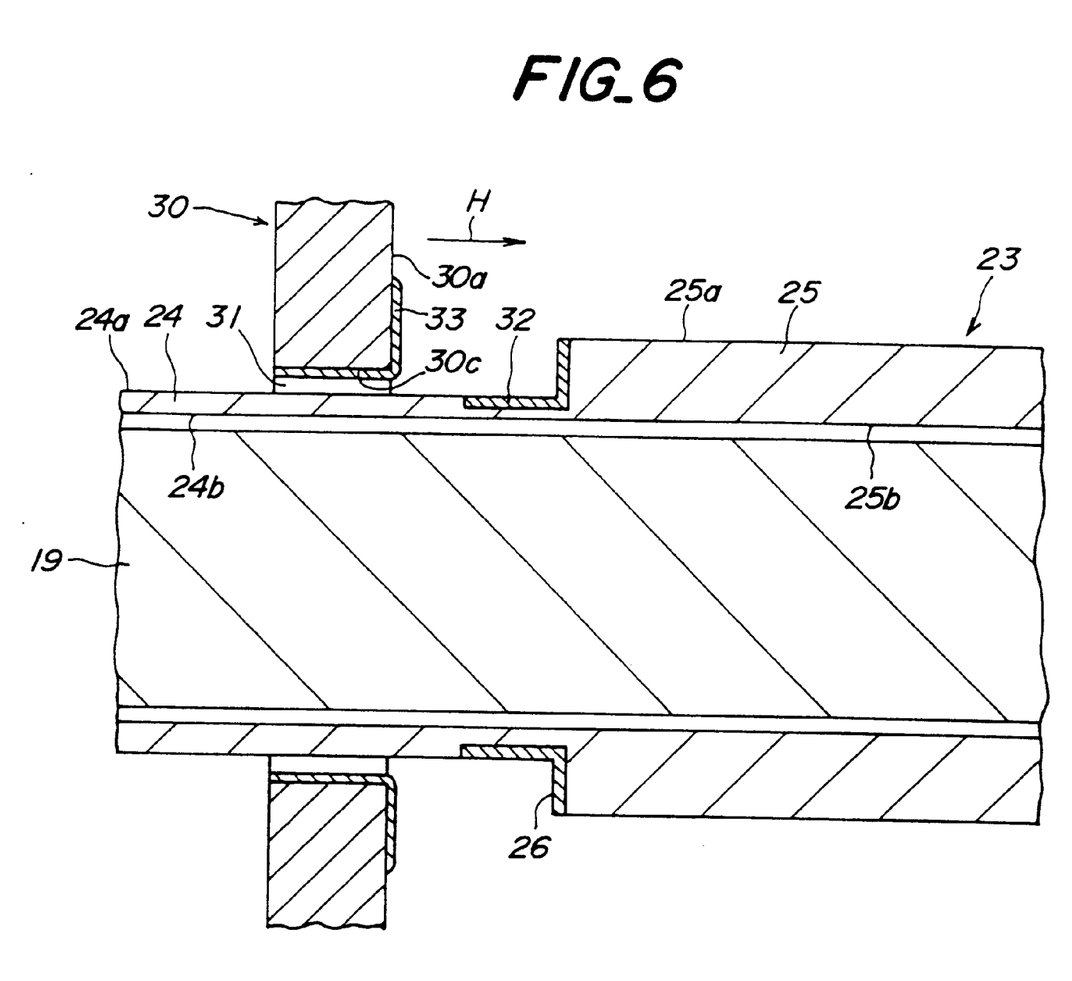
FIG. 6 is a diagrammatically sectional view illustrating a state of assembling a calcined body 30 for the flange member onto a first portion 24 of a calcined body 23 for the passage tube body.

When the calcined body for the flange member is set onto the passage tube body, as shown in FIG. 6, the first portion 24 is inserted into a central hole 30c of the calcined body 30 for the flange member and then the calcined body 30 is moved toward the stepped region 26 as shown by arrow H.

In a preferable embodiment, water is applied to a part of the outer peripheral surface 24a of first portion 24 and an end face of the second portion 25 forming the stepped region 26 to form a water impregnated layer 32 prior to the setting of the calcined body 30 for the flange member. Particularly, such an impregnated layer is easily formed because the degreased body of translucent alumina has water pickup to a certain extent. And also, such a water impregnated layer may be formed in a portion of the calcined body 30 for the flange member that contacts with the stepped region.

Figure 7:
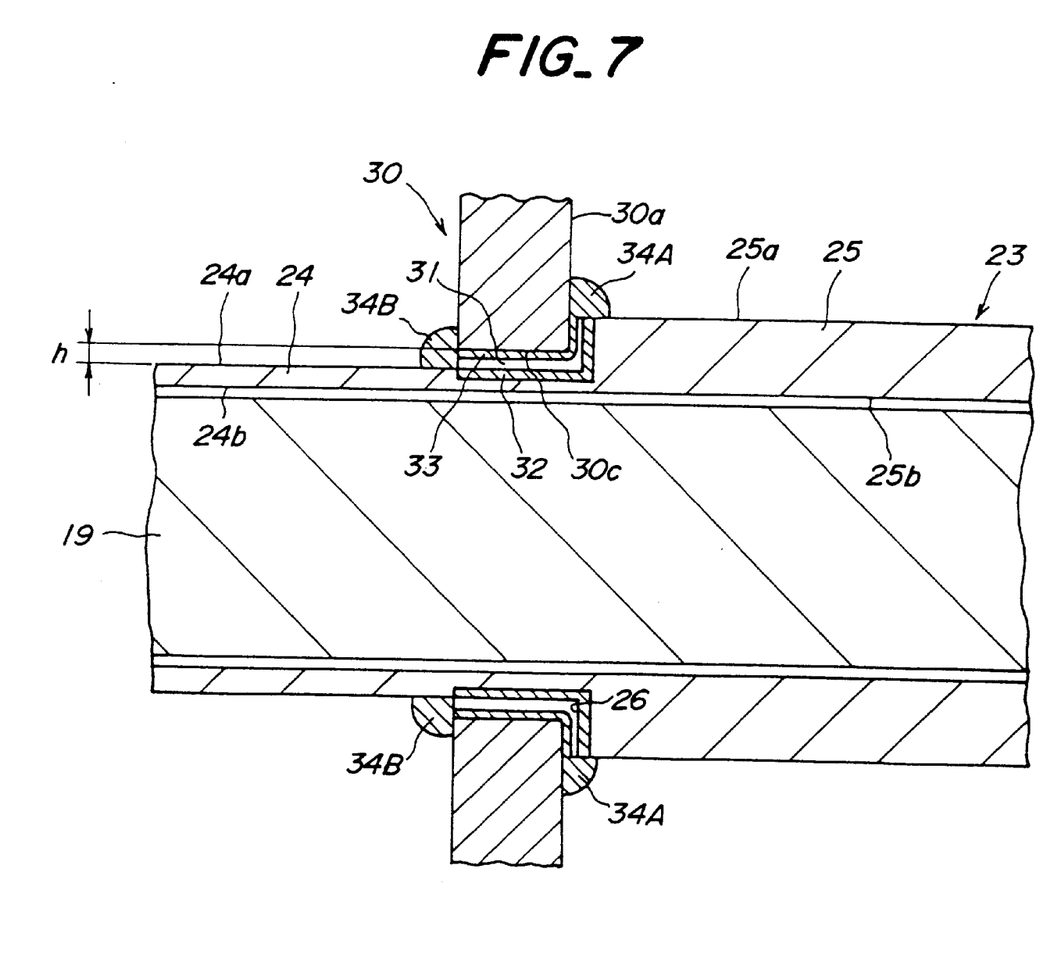
FIG. 7 is a diagrammatically sectional view illustrating a state of fixing a calcined body 30 for the flange member to a stepped region 26 in a calcined body 23 for the passage tube body.

In the illustrated embodiment, a ceramic paste 33 is applied to a portion of the calcined body 30 for the flange member that contacts with the stepped region 26. As shown in FIG. 7, the calcined body 30 for the flange member is substantially contacted with and fixed to the stepped region 26. At this state, the calcined bodies 30 and 23 are maintained perpendicularly to each other. Next, lumps 34A of the ceramic paste are adhered to the vicinity of an end portion of a clearance between the calcined body 30 and an end face of the second portion 25 or the stepped region 26, while lumps 34B of the ceramic paste are adhered to the vicinity of an end portion of a clearance between the calcined body 30 and the outer peripheral surface 24a of the first portion 24. Means for adhering the ceramic paste is not particularly limited, but a writing brush, paintbrush or the like may be used.

Figure 8:
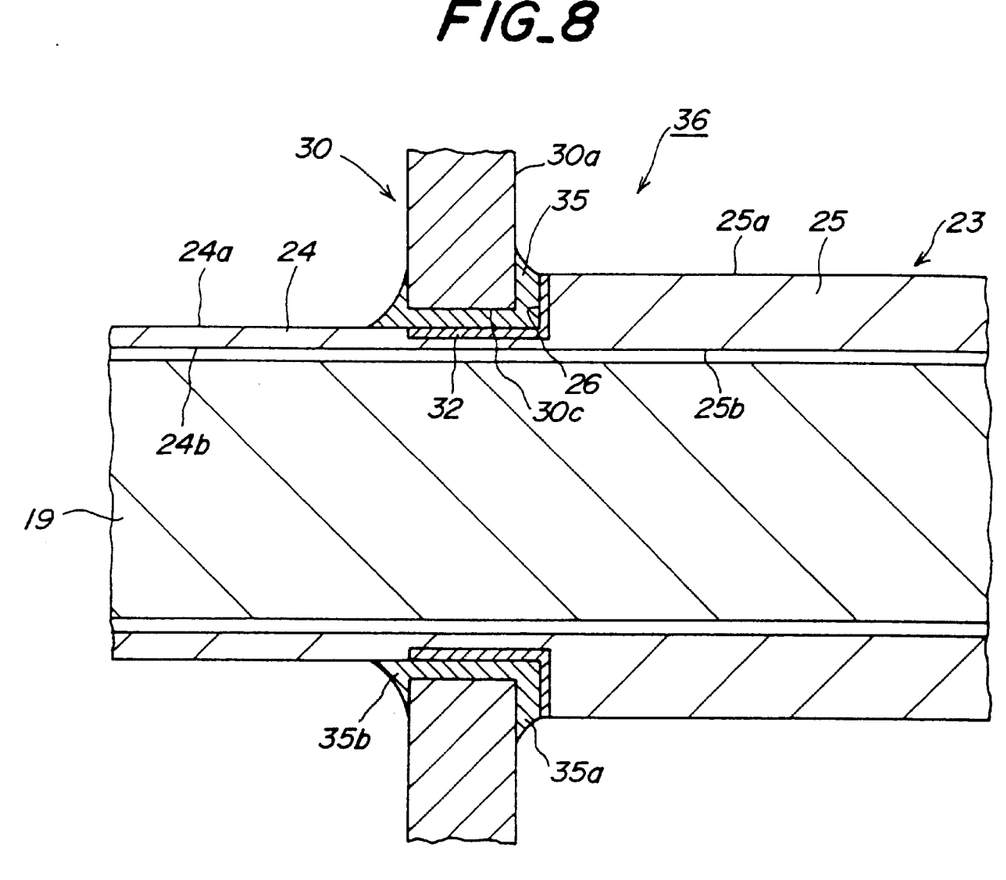
FIG. 8 is a diagrammatically sectional view illustrating a main part of an assembled body 36.

Thereafter, the lumps 34A, 34B of the ceramic paste are pushed into a clearance 31 defined between the calcined bodies 30 and 23 with a brush or the like. Thus, as shown in FIG. 8, a ceramic paste layer 35 can be formed between a main surface 30a of the calcined body 30 and the end face of the calcined body 25 as the second portion or the stepped region 26, and between an inner surface 30c of the calcined body 30 and the outer peripheral surface 24a of the calcined body 24 as the first portion. And also, outer surfaces 35a and 35b of the ceramic paste layer 35 are smoothened by means of the brush or the like. In this way, there is obtained an assembled body 36 composed of the calcined body for the passage tube body and the calcined body for the flange member.

In order to facilitate the flow of ceramic paste into the clearance 31, it is favorable that a size "h" of the clearance 31 is not less than 0.10 mm. On the other hand, in order to improve the joint strength between the passage tube body and the flange member after the sintering, the size "h" of the clearance 31 is favorably not more than 0.15 mm.

Figure 9:
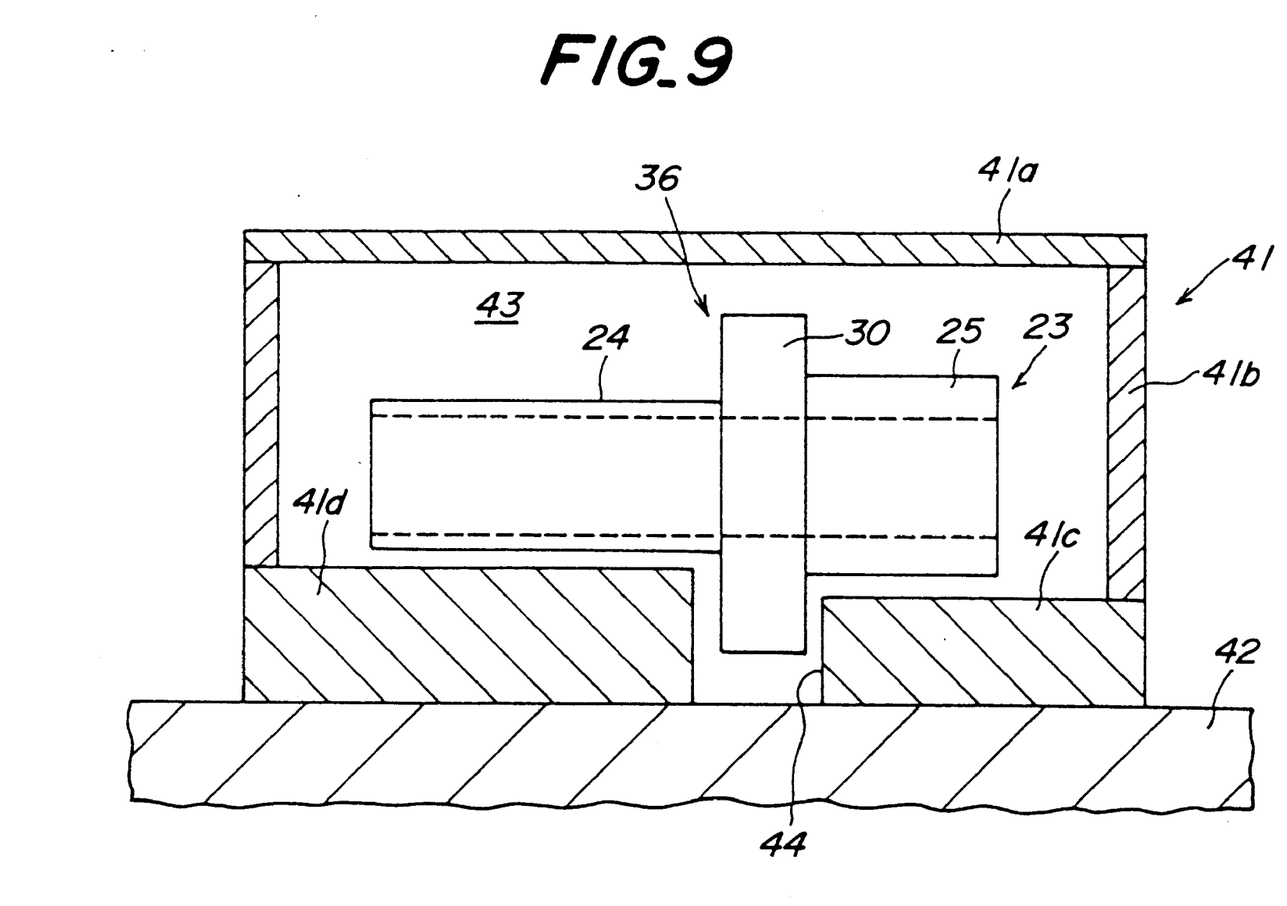
FIG. 9 is a schematically sectional view illustrating a state of placing an assembled body 36 composed of calcined bodies 23 and 30 in an electric furnace 41.

It is preferable that the ceramic paste layer is subjected to subsequent degreasing. For example, as schematically shown in FIG. 9, the paste can be degreased in an electric furnace 41. In the FIG. 9, the electric furnace 41 is placed on a floor 42. The electric furnace 41 comprises pedestal portions 41c and 41d having slightly different heights, and wall portions 41b and a lid portion 41a. In an inner space 43 of the electric furnace 41 is filled an oxidizing atmosphere in case of the translucent alumina, and the assembled body 36 composed of the calcined bodies 23 and 30 is housed therein. In this case, a lower part of the calcined body 30 for the flange member in the assembled body 36 is housed in a gap 44 defined between the pedestal portions 41c and 41d.

In a preferable embodiment of the invention, an assembled body 45 after the degreasing of the joining paste is then sintered at a state of suspending it in a vertical direction. In an embodiment shown in FIG. 10, the calcined body 30 for the flange member is placed on a supporting plate 47 through a setter 46, while the calcined body 24 as the first portion is inserted into a center hole 46a of the setter 46 and a center hole 47a of the plate 47 at the suspended state.

The following example is given in illustration of the invention and is not intended as limitation thereof.

The passage tube 1 shown in FIG. 1 is manufactured according to the above-mentioned method referred to FIGS. 2–10.

Concretely, a high purity alumina powder ("UA5100": trade name, made by Showa Denko Co., Ltd.) is used. A purity of the powder is 99.99%. A slurry having an average particle size of 0.45 μm and pH of 4.5–6.0 is prepared by mixing 48–50 parts by weight of this alumina powder with 50–48 parts by weight of pure water and 750 ppm as MgO of magnesium nitrate and then pulverizing the mixed powder for 10–15 hours.

The slurry is passed through a 44 μm mesh nylon sieve and mixed with 3 parts by weight of an organic binder in a slurry tank with stirring. The resulting slurry is granulated through a spray dryer, and the resulting granulated powder is passed through a 149 μm mesh nylon sieve to obtain powder for cold isostatic press (CIP) shaping.

This powder has an average particle size of 80 μm±10 μm, a static bulk density of 0.7–0.9 g/cm$^3$, and a water content of not more than 0.3% by weight.

The above powder is placed in a mold for CIP shaping. In this case, a urethane rubber mold is used, while a core made of SKD-11 plated with hard chromium in a thickness of 10 μm is used in the inside of the mold. The mold is sealed and then placed in a vessel for CIP shaping to conduct the shaping under a pressure of 1,850 kg/cm$^2$. In this case, the core has a diameter of 27 mm and a length of 450 mm. The thus obtained tubular shaped body is taken out from the mold to obtain a shaped body 12 as shown in FIG. 2a. The shaped body 12 has an outer diameter of 33–34 mm, an inner diameter b of 27 mm, a full length of 450 mm, and a thickness a of 3–3.5 mm.

On the other hand, the above granulated powder is charged into another mold for CIP shaping. In this case, a urethane rubber mold is used, while a core made of SKD-11 plated with hard chromium in a thickness of 10 μm is used in the inside of the mold. The rubber mold has an inner diameter of 126 mm and a length of 200 mm, and the core has an outer diameter of 28.75 mm and a length of 200 mm. The mold is sealed and then placed in a vessel for CIP shaping to conduct the shaping under a pressure of 1,850 kg/cm$^2$, whereby a disc-type shaped body 14 as shown in FIG. 2b is obtained. The shaped body 14 has an outer diameter "e" of 75 mm and an inner diameter "d" of 28.75 mm.

Then, the outer peripheral surface of the tubular shaped body is subjected to cutting over a thickness of 1–1.5 mm so as to give the tubular shaped body a constant outer diameter (32.5–33 mm). On the other hand, both main surfaces of the disc-type shaped body 14 are machined with a cutting tool, polished with a #800 sandpaper and then buffed with cloth.

The tubular shaped body 12 and the disc-type shaped body 14 are placed in an electric furnace as shown in FIG. 3 and calcined in an oxidizing atmosphere. In this case, the temperature is raised from room temperature to 450° C. at a rate of 80° C./hour and kept at 450° C. for 2 hours and then raised to 850° C. at a rate of 80° C./hour and kept at 850° C. for 3 hours, and thereafter cooled.

The tubular shaped body after the calcination is fixed as shown in FIG. 4a and machined with a cutting tool to obtain a calcined body 23 as shown in FIG. 4b. Then, the outer peripheral surfaces 24a and 25a of the calcined body 23 are polished with a #800 sandpaper and buffed with cloth. Further, these outer peripheral surfaces 24a and 25a are rubbed with acetone impregnated cloth.

The resulting calcined body 24 corresponding to a first portion has an inner diameter of 27.0 mm, an outer diameter of 28.63 mm, a thickness "f" of about 0.8 mm, and a length of 280 mm. On the other hand, the calcined portion 25 corresponding to a second portion has an inner diameter of 27.0 mm, an outer diameter of 31.17 mm, a thickness "g" of about 2.1 mm, and a length of 140 mm. In this case, a clearance between the calcined body 24 as the first portion and the calcined body 30 is within a range of 0.10–0.15 mm.

Then, the calcined body 23 is fixed by chucks 27 of a lathe as shown in FIG. 5 and thereafter the calcined body 30 for the flange member is fitted onto the outside of the calcined body 24 as the first portion and joined to each other through an alumina paste as shown in FIGS. 6–8. The alumina paste is comprised of 45.5% by weight of alumina powder, 50% by weight of water and 4.5% by weight of a binder.

The thus obtained assembled body 36 is degreased as shown in FIG. 9. In this case, the temperature is raised from room temperature to 850° C. at a rate of 100° C./hour and kept at this temperature for 3 hours, and then cooled.

Figure 10:
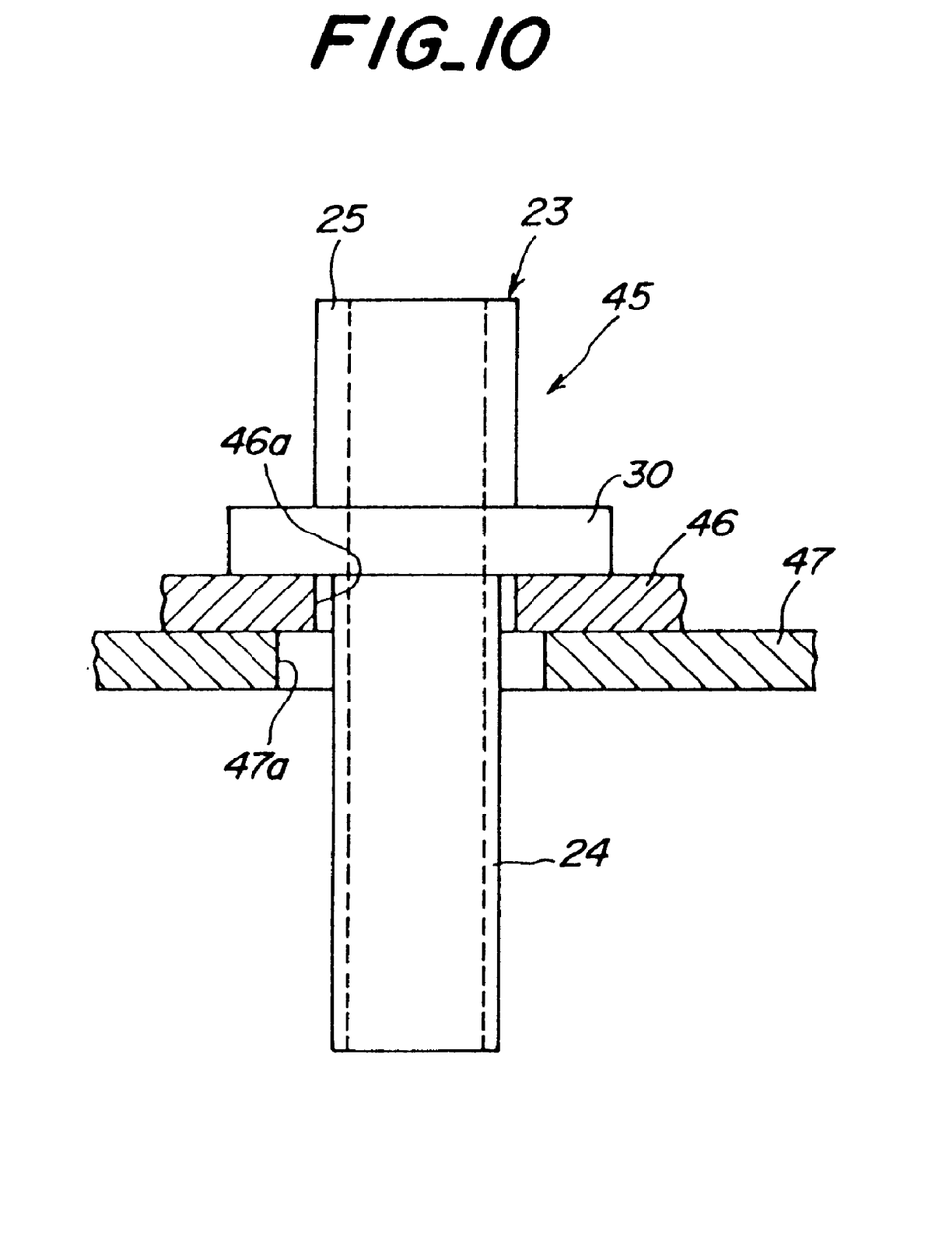
FIG. 10 is a schematically sectional view illustrating a state of sintering an assembled body 45 at a suspended state.

The thus degreased assembled body 45 is sintered in a hydrogen batch furnace ($H_2+N_2=3:1$) having a diameter of 1 m and a height of 1.5 m as shown in FIG. 10, in which a high purity alumina is used as a material of a setter 46 and a molybdenum plate is used as a plate 47. In this case, the temperature is raised from room temperature to 1350° C. at a rate of 1350° C./hour, from 1350° C. to 1870° C.–1900° C. at a rate of 150° C./hour–200° C./hour, and kept at 1870° C.–1900° C. for 5 hours, and then cooled.

Both ends of the thus manufactured passage tube are subjected to polishing. The whole of the passage tube is washed with ultrasonic wave, and then washed with acetone and pure water in this order according to the same process as in semiconductor parts.

With respect to the thus manufactured passage tube, the angle defined between the tube body and the flange member and the leakage of gas from an interface therebetween are measured as follows.

Moreover, the sizes of various portions in the passage tube after the sintering are shown in FIG. 1. Each numerical value has a unit of mm. Concretely, the first portion 2 of the passage tube 1 has an inner diameter of 27.5 mm and an outer diameter of 29 mm, and the second portion 3 has an outer diameter of 30 mm, while the flange member 4 has a diameter of 55 mm and a thickness of 5 mm. And also, the passage tube 1 has a full length of 280 mm, in which the length of the first portion 2 is 200 mm and the length of the second portion 3 is 80 mm.

[Angle Defined Between the Passage Tube Body and the Flange Member]

A squareness, a deflection and a parallelism between the passage tube body and the flange member are measured according to JIS B-0021. As a result, the squareness is 0.082 mm, and the deflection is 0.41 mm, and the parallelism is 0.053 mm.

[Leakage of Gas From Interface Between the Passage Tube Body and the Flange Member]

When a leak test of He is carried out according to MIL-STD-883C of the Military standard, the leakage is not more than $1 \times 10^{-9}$ He.atm.cc/sec. That is, there is no leakage of He.

Then, a test is carried out with respect to the corrosion resistance of the passage tube against plasma. That is, a specimen having a size of 10 mm×10 mm×0.5 mm is cut out from the above passage tube body and placed in a vacuum chamber. This vacuum chamber is provided with a microwave oscillator.

The specimen is heated to 500° C. with a heater, while an interior of the chamber is reduced to a pressure of 100 mmTorr and 200 cc/minute of $NF_3$ gas and 25 cc/minute of argon gas at 0° C. under 1 atmospheric pressure are introduced into the chamber, during which plasma is produced by means of the microwave oscillator of 13.56 MHz and 450 W. The weight of the specimen is measured before and after the test, and the weight change is calculated from these measured values, from which an etching rate is calculated. As a result, the etching rate is 0 angstrom/second.

As mentioned above, according to the invention, in the manufacture of the passage tube comprising a ceramic passage tube body through which plasma producing gas passes and is irradiated from outside the ceramic tube body with ultraviolet rays, and a ceramic flange member joined to an outer peripheral surface of the ceramic tube body through which plasma producing gas passes and is irradiated from outside the ceramic tube body with ultraviolet rays, and a ceramic flange member joined to an outer peripheral surface of the ceramic tube body, the flange member can extend in a direction perpendicular to the tube body and the leakage of the plasma producing gas from a joint interface between the tube body and the flange member can be prevented.

What is claimed is:

1. A method of manufacturing a passage tube that includes a ceramic tube body through which plasma producing gas passes and is irradiated from outside the ceramic tube body with ultraviolet rays, and a ceramic flange member joined to an outer peripheral surface of the ceramic tube body, said method comprising the steps of:

calcining a shaped ceramic tube body to obtain a calcined ceramic tube body;

machining an outer peripheral surface of the calcined ceramic tube body to form a first portion and a second portion having an outer diameter larger than that of the first portion with a stepped region defined between the outer peripheral surface of the first portion and the outer peripheral surface of the second portion;

joining a calcined body for the ceramic flange member to the stepped region of the calcined ceramic tube body to obtain an assembled body; and sintering the assembled body.

2. The method of claim 1, wherein the ceramic tube body comprises translucent alumina, and a calcining temperature of the ceramic tube body is not lower than 750° C. but not higher than 950° C.

3. The method of claim 1, wherein the ceramic flange member is joined to the ceramic tube body so as to extend in a direction substantially perpendicular to the ceramic tube body.

4. The method of claim 1, wherein the calcined body for the ceramic flange member is positioned on the stepped region of the calcined body for the ceramic tube body, and a ceramic paste layer is formed between the calcined body for the ceramic tube body and the calcined body for the ceramic flange member to obtain an assembled body, and then the assembled body is sintered.

5. The method of claim 4, further comprising the step of applying water to at least a surface of the stepped region of the calcined body for the ceramic tube body prior to the formation of the ceramic paste layer.

* * * * *